United States Patent Office 3,715,350
Patented Feb. 6, 1973

3,715,350
**NOVEL METHOD FOR THE PREPARATION OF
2α,3α-EPITHIO-α-STEROIDS**
Yoshio Hamashima, Kyoto, Japan, assignor to
Shionogi & Co., Ltd., Osaka, Japan
No Drawing. Filed Apr. 9, 1971, Ser. No. 130,856
Int. Cl. C07c *173/10*
U.S. Cl. 260—239.5                    28 Claims

ABSTRACT OF THE DISCLOSURE

Hormonal 2α,3α-epithio-5α-steroids are prepared by a novel method comprising (i) a new process which consists of treating a 3-halo- or acyloxy-5α-steroid with a basic acid-eliminating reagent to give a corresponding Δ²-5α-steroid; (ii) another new process consisting of a first step in which a Δ²-5α-steroid is treated with a sulfur halide compound to give a 3β- or 2β-halo-5α-steroid-2α- or 3α-polysulfide, and a second step in which the product of the first step is treated with reducing and dehalogenating reagents to obtain the objective 2α,3α-epithio-5α-steroids.

---

The present invention relates to a novel method for the preparation of 2α,3α-epithio-5α-steroids and intermediates thereof. More specifically, it relates to a method for preparation of 2α,3α-epithio-5α-steroids which comprises (i) a new process which consists of treating a 3(α or β)-halo- or acyloxy-5α-steroid (IV) with a basic acid-eliminating reagent to give a corresponding Δ²-5α-steroid (I); (ii) another new process consisting of a first step in which a Δ²-5α-steroid (I) is treated with a sulfur halide compound (V) to give a 3β- or 2β-halo-5α-steroid-2α- or 3α-polysulfide (II, adduct), and a second step in which the product of the first step (II) is treated with reducing and dehalogenating reagents to obtain the objective 2α,3α-epithio-5α-steroid (III). The invention also relates to the intermediates (II) of the second process above mentioned.

The processes of the present invention are illustrated in the following reaction scheme, which shows the steroid nuclei and reaction sites of the molecule:

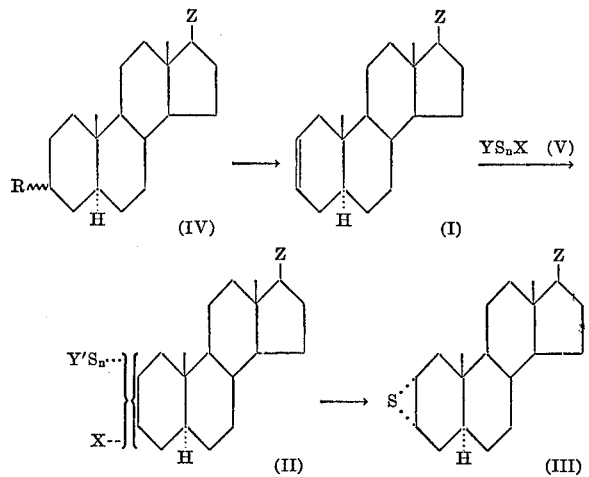

wherein X represents a halogen atom; Y represents a halogen atom or an optionally substituted lower hydrocarbon group; Y' represents Y or another steroid moiety; Z represents a side chain of the steroid or a mono- or bi-valent oxygen function; R represents a halogen atom or an acyloxy group; and $n$ represents an integer of 2 or more.

One of the two processes of this invention comprises reaction of a 3(α or β)-halo- or acyloxy-5α-steroid (IV) with a basic acid-eliminating reagent to give a corresponding Δ²-5α-steroid (I). The compound (I) can be prepared by a conventional method for known compounds. The simplest method is by elimination of hydrogen halide, water, or acid from a 3(α or β)-halo-, hydroxy-, or acyloxy-5α-steroid. However, such an elimination results in a main product, the Δ²-compound, and a by-product, the Δ³-compound, which are not readily separable by usual treatments. Position isomers of products of the subsequent reaction stages of the method for obtaining 2α,3α-epithio-5α-steroids are also very difficult to separate from each other. In order to produce an end product suitable for pharmaceutical use, therefore, a high purity of the starting material for the second process of the method is essential. The present inventor found that the isomer ratio of the elimination product can be very much improved by treating the starting material, a 3(α or β)-halo- or acyloxy-5α-steroid, with a stronger base for the elimination of the corresponding acids. Conventional elimination methods; by pyrolysis of a 3-halo- or acyloxy group in the presence of an acid acceptor, e.g. pyridine; by dehydration of a 3-hydroxy group under acid conditions, e.g. with diluted sulfuric acid or thionyl chloride; or by enolization of a 3-oxo group in the presence of an acid catalyst, e.g. toluene-p-sulfonic acid, give products in the Δ²:Δ³ ratio of about 2:1–4:1, whereas the new process of this invention by base-catalyzed elimination gives product isomers in the ratio of about 20:1 or more. In a preferable case, no detectable amount of Δ³-5α-steroid is found in the crystals obtained. Thus, purification of the product is simplified. In some cases, mere recrystallization is sufficient to give a product suitable for use as a starting material for the production of 2α,3α-epithio-5α-steroids. The starting compound (IV) for the process is a 3(α or β)-halo- or acyloxy-5α-steroid obtainable from the corresponding 3(α or β)-hydroxy-5α-steroid by substitution with halogen or acylation of the 3-hydroxy group by known methods. It can belong to the estrane, androstane, pregnane, spirostane, cholane, or cholestane series, and can possess inert substituents at various positions of the steroidal nucleus, e.g. at positions 1, 2, 3, 4, 5, 6, 7, 8, 9, 11, 16, 17, 18, 20, 21, etc. The substituents can be lower hydrocarbon groups, e.g. methyl, ethyl, isopropyl, octyl, vinyl, ethynyl, optionally substituted phenyl, etc.; oxygen functions, e.g. oxo, hydroxy, ketal, acyloxy, alkoxy, cycloalkyloxy, epoxy, etc.; nitrogen functions, e.g. nitro, amino, etc.; carboxy, alkoxycarbonyl, cyano, unsaturated bonds; halogens, e.g. fluorine, chlorine, bromine, etc., and the like. The halogen or acyloxy group at position 3 is exemplified as follows: the halogen can be chlorine, bromine, or iodine; the acyloxy group can be an optionally substituted aliphatic or aromatic carboxy group, e.g. formyloxy, acetyloxy, propionyloxy, butyryloxy, valeryloxy, isovaleryloxy, octanoyloxy, dodecanoyloxy, cyclohexanecarbonyloxy, adamantoyloxy, β-phenylpropionyloxy, methacryloxy, glycyloxy, etc.; an aliphatic sulfonyloxy group, e.g. methanesulfonyloxy, ethanesulfonyloxy, propanesulfonyloxy, pentanesulfonyloxy, cyclohexanesulfonyloxy, benzylsulfonyloxy, diphenylmethanesulfonyloxy, etc.; an optionally substituted mono- or poly-cyclic aromatic carboxy, e.g. benzoyloxy, p-nitrobenzoyloxy, m-chlorobenzoyloxy, p-bromobenzoyloxy, α-naphthalenecarboxy, etc.; or an optionally substituted mono- or poly-cyclic aromatic sulfonyloxy, e.g. benzenesulfonyloxy, p-bromobenzenesulfonyloxy, p-toluenesulfonyloxy, β-naphthalenesulfonyloxy, pyridine-3-sulfonyloxy, etc.

The new process for the preparation of the unsaturated intermediate (I) is carried out by treating a starting compounds (IV) cited above with a basic acid-eliminating reagent. The acid-eliminating reagent is a base sufficiently strong to effect the elimination of the corresponding acid from the starting compound (IV) cited above, to give a 2(3)-unsaturated 5α-steroid (I). Representatives of the basic acid-eliminating reagent are: alkali metal alkoxides, e.g. alkali metal methoxides, ethoxides, tert-butoxides, etc.; sodium or potassium salts of dimethyl sulfoxide and dimethylformamide; alkali metal hydrides, e.g. sodium hydride, potassium hydride, etc.; alkali metal amides, e.g. sodium amide, potassium amide, etc.; alkali metal hydroxides, e.g. sodium hydroxide, potassium hydroxide, etc.; quarternary ammonium hydroxides, e.g. benzyltrialkylammonium hydroxide, etc.; alkali metal hydride complexes, e.g. lithium aluminum hydride, potassium aluminum hydride, lithium alkylaluminum hydrides, potassium alkoxyaluminum hydrides, etc.; and other reagent or mixtures thereof having equivalent effectiveness for the elimination. The process is carried out in the presence of a solvent. The solvent can be: a hydrocarbon, e.g. petroleum ether, hexane, benzene, toluene, etc.; a halogenated hydrocarbon, e.g. dichloromethane, chloroform, chlorobenzene, etc.; an ether, e.g. diethyl ether, dioxane, tetrahydrofuran, etc.; a ketone, e.g. acetone cyclohexanone, etc.; an ester, e.g. ethyl acetate, butyl acetate, etc.; an alcohol, e.g. methanol, ethanol, isopropanol, tert-butanol, etc.; an organic base, e.g. pyridine, collidine, quinoline, etc.; water, liquid ammonia, dimethyl sulfoxide, dimethylformamide, acetonitrile, and the like, or any mixture thereof. Especially preferable solvents involve dimethyl sulfoxide, dimethylsulfone, etc., which potentiate the reactivity of the basic acid-eliminating reagent. The reaction may be carried out by stirring and under exclusion of oxygen and moisture, at ambient or elevated temperature. Preferable results are obtained when more than 1 mole equivalent of potassium tertiary butoxide is used in the reaction; when the weight of dimethyl sulfoxide is more than twice that of the starting steroid is used; and especially when the reaction is carried out at a temperature in the range from 60° C. to 95° C., for a duration of from 30 minutes to 5 hours. The product thus formed is isolated and purified by conventional methods, e.g. neutralization of the reaction mixture, extraction, washing, drying, evaporation of the solvent, chromatography, recrystallization, and the like. Sometimes, a side reaction, e.g. hydrolysis or oxidation by air, solvent, or reagent, may be observed. These byproducts e.g. 3α-hydroxy-5-α-androstan-17-one, are easily separable from the main product (I), and can be converted to the starting compound (IV) by conventional methods, e.g. by tosylation. The position isomer ratio of the product can be determined by analysis of its mass spectrum, optical rotatory dispersion curve, or by other methods. The product of the process is a $\Delta^2$-5α-steroid optionally accompanied with a lesser amount of $\Delta^3$-5α-steroid. When a 3-hydroxy compound is found in the product, the mixture is again halogenated or acylated, and treated with a basic acid-eliminating reagent, to improve the yield up to 90%.

Another process of this invention comprises a first step consisting of treating a $\Delta^2$-5α-steroid (I) with a sulfur halide compound (V) to give a 3β- or 2β-halo-5α-steroid-2α or 3α-polysulfide (II, adduct), and a second step consisting of treating the compound (II) with reducing and dehalogenating reagents to obtain the objective 2α,3α-epithio-5α-steroid (III). The process starting from the compound (I) to obtain the compound (III) is the first successful application in the field of steroid chemistry of a reaction described in the Journal of Organic Chemistry, volume 34, p. 3991 (1969) for other fields of organic chemistry. It has now been discovered that the thiosulfenyl part of the reagent (V) attacks from the α-side of the steroid molecule and that the end product has an α-epithio group. Moreover, the total yield is high, and the product has high purity. Although the authors of the said prior art reference reported than an excess of olefin is requisite for successful reaction and that a lesser amount leads to failure of the reaction, the present inventor succeeded in obtaining the product in high yield with less than 0.7 mole equivalents of the olefin, thus saving expensive olefin, namely the starting steroid (I). According to a known method, the objective compounds (III) may be prepared from the same starting material (IV) in about 20% yield by a seven-step process. The present process in three steps from the compound (IV) gives the objective compound (III) in a yield of more than 50%. By-products produced in this new process are easily separable by conventional treatments to give objective products of high purity.

The first step is carried out by treating the said starting material (I) with a sulfur halide compound (V).

The starting material for this process is a $\Delta^2$-5α-steroid, belonging to the estrane, androstane, pregnane, spirostane, cholane or cholestane series. The steroid can be in nor or homo analogue. It can have substituents at various positions of the steroidal nucleus, e.g. at positions 1, 2, 3, 4, 5, 6, 7, 8, 9, 11, 16, 17, 18, 19, 20, 21, etc. The substituents can be lower hydrocarbon groups, e.g. methyl, ethyl, isopropyl, octyl, vinyl, ethynyl, etc.; optionally substituted phenyl, etc.; oxygen functions, e.g. oxo, hydroxy, ketal, acyloxy, alkoxy, cycloalkyloxy, epoxy, etc.; nitrogen functions, e.g. nitro, amino, etc.; carboxy; alkoxycarbonyl; cyano; unsaturated bonds; halogens, e.g. chlorine, bromine, etc. and the like.

As examples of the starting material for the process of this invention, the following steroids are illustrative:

5α-androst-2-en-17β-ol,
A-nor-5α-androst-2-en-17β-ol,
5α-ester-2-en-17β-ol,
1α-methyl-5α-androst-2-en-17β-ol,
2-methyl-5α-androst-2-en-17β-ol,
3-methyl-5α-androst-2-en-17β-ol,
7α-methyl-5α-androst-2-en-17β-ol,
8β-methyl-5α-androst-2-en-17β-ol,
17α-methyl-5α-androst-2-en-17β-ol,
18-methyl-5α-androst-2-en-17β-ol,
17α-vinyl-5α-androst-2-en-17β-ol,
17α-ethynyl-5α-androst-2-en-17β-ol,
6β,17α-dimethyl-5α-androst-2-en-17β-ol,
7α,17α-dimethyl-5α-androst-2-en-17β-ol,
6β,17β-dihydroxy-5α-androst-2-ene,
7α,17β-dihydroxy-5α-androst-2-ene,
5α-androsta-2,9(11)-dien-17β-ol,
5α-androsta-2,6-dien-17β-ol,
17-exomethylene-5α-androst-2-ene,
5α-androst-2-ene-17β-carboxylic acid,
5α-pregn-2-en-20-one,
17α-hydroxy-5α-pregn-2-en-20-one,
17α-hydroxy-5α-pregn-2-ene-11,20-dione,
17α,21-dihydroxy-5α-pregn-2-ene-11,20-dione,
11β,17α-dihydroxy-9α-fluoro-5α-pregn-2-en-20-one,
5α-spirost-2-ene,
5α-chol-2-enic acid, and
5α-cholest-2-ene.

The oxidized 17-oxo derivatives of 5α-androst-2-en-17β-ol derivatives having a 17α-hydrogen atom, e.g. 5α-androst-2-en-17-one, A-nor-5α-androst-2-en-17-one, 1α-methyl-5α-androst-2-en-17-one, 7α - methyl-5α-androst-2-en-17-one, 6β-hydroxy-5α-androst-2-en-17-one, 5α-adrosta-2,9(11)-dien-17-one, etc., are also important. When acylable hydroxyl groups are present in the molecule, their esters are also important starting materials: for example, a lower aliphatic acylate, e.g. formate, acetate, propionate, valerate, enanthate, trimethylacetate, tert-butylacetate, cycloalkylalkanoate, adamantoate, methacrylate, succinate, camphorate, phenylacetate, phenoxyacetate, haloacetate, etc.; an aromatic acylate, e.g. optionally substituted benzoate, furoate, nicotinate, phthalate, etc.; an inorganic acylate, e.g. sulfate, phosphate, carbonate, etc.; and a sulfonate, e.g. methylsulfonate, ethylsulfonate, cyclohexanesulfonate, toluene-p-sulfonate, etc. When etherifiable hydroxyl groups are present in the molecule, their ethers are also available for the starting materials: for example, tetrahydropyranyl, tetrohydrofuranyl, 1-lower cycloalkenyl, 1-lower alkoxy-1-cycloalkyl ethers, etc.

The sulfur halide compound can be shown by a general formula as follows:

$$YS_nX \qquad (V)$$

wherein X represents a halogen atom; Y represents a halogen atom or an optionally substituted lower hydrocarbon group; and $n$ represents an integer of 2 or more. The halogen atom represented by X or Y is chlorine, bromine, or iodine. The lower hydrocarbon group represented by Y is an optionally substituted aliphatic or aromatic hydrocarbon group. As examples of the sulfur halide compounds, the following are illustrative: sulfur halides, e.g. sulfur monochloride (disulfur dichloride or sulfur subchloride), sulfur monobromide; trisulfur dichloride; tetrasulfur dichloride, etc.; aliphatic, aralkyl or aryl hydrocarbonthiosulfenyl halides, e.g. methanethiosulfenyl chloride, ethanethiosulfenyl chloride, butanethiosulfenyl chloride, benzylthiosulfenyl chloride, phenylthiosulfenyl bromide, a substituted phenylthiosulfenyl halide (e.g. o-nitrophenylthiosulfenyl chloride, toluene-p-thiosulfenyl chloride, etc.), p-bromobenzylthiosulfenyl chloride, o-nitrophenyltrithiosufenyl chloride, 2,4-dinitrophenyltetrathiosulfenyl chloride, and the like.

Preferable results are obtained when less than 1 mole equivalent of the $\Delta^2$-5α-steroid is treated with 1 mole equivalent of the sulfur halide compound, especially when the steroid is an optionally substituted $\Delta^2$-5α-androstane or pregnane. The reaction is preferably carried out in a suitable solvent. While acetone retards the addition, preferable results have been obtained when halogenated hydrocarbons, ethers, or acetonitrile is used as the solvent. Acetonitrile is the most suitable, as it accelerates the reaction, and dichloromethane is also convenient. The reaction proceeds smoothly even at room temperature to give the 3β- or 2β-halo-5α-steroid-2α- or 3α-polysulfide (II, adduct) in good yield. If necessary, the reaction temperature may be elevated or lowered. Usually, the reaction is carried out at a temperature from 0–40° C., for 1 to 50 hours. The reaction can be accelerated by the presence of metallic catalysts, e.g. nickel, iron, chromium, manganese, vanadium, etc., of which iron is preferable. The product of the first step is subjected to the second step after or without purification.

The second step is a reaction of the product from the first step with reducing and dehalogenating reagents. The reducing reagent is one capable of reducing a polysulfide bond to yield a thiol or a group equivalent to the thiol group, e.g. sulfide anion anion, sulfur radical, etc. Typical examples of such reducing reagents are as follows: metal hydride complexes, e.g. sodium borohydride, lithium aluminum hydride, etc.; alkaline earth or alkali metal sulfides, e.g. sodium sulfide, potassium sulfide, calcium sulfide, barium sulfide, etc.; metal amalgums, e.g. sodium amalgum, aluminum amalgum, etc.; alkali metals, e.g. potassium, sodium, or lithium in liquid ammonia; alkali metals in alcohol; and reducing metals salts, e.g. mercurous salts, ferrous salts, etc. Thiol compounds, e.g. methyl mercaptane, cysteine, etc.; and hydrogenation over various catalysts, e.g. palladium on charcoal, etc. can also serve as reducing method. The dehalogenating reagent of the second step is a base capable of converting the halo-thiol, its salts, or its equivalents, into the epithio compounds. Typical examples of the dehalogenating reagent of the second step are as follows: an alkali metal carbonate; an alkali metal hydroxide; an organic base, e.g. a quarternary ammonium hydroxide; an alkali metal hydride complex; an alkaline earth or alkali metal sulfide; an alkali metal in liquid ammonia; an alkali metal in an alcohol; and a basic metal salt, etc. The reducing and dehalogenating reagents can be used in the reaction simultaneously or separately from each other, and the intermediate need not necessarily be isolated. Alternatively, the reducing and dehalogenating reagents may be the same bifunctional reagent showing reducing and dehalogenating reactivity. Preferable results are obtained when the reducing and dehalogenating reagent is an alkali metal sulfide, e.g. sodium sulfide; an alkali metal borohydride, e.g. sodium borohydride, or the like. Preferable results are also obtained when the reducing reagent is sodium borohydride and the dehalogenating reagent is potassium hydroxide. The reaction is carried out in a suitable solvent, e.g. an alcohol, an ether, a halogenated hydrocarbon, dimethyl sulfoxide, etc. The reaction temperature can be higher or lower than room temperature. Preferably, the reaction is carried out at a temperature from 0° C. to 40° C. for 0.1 to 5 hours. The product of this step may be isolated and purified by a conventional procedure, e.g. recrystallization, chromatography, etc. There is some possibility that the abstraction of halogen precedes epithio group formation, reduction then taking place at the sulfur atom cleaved. Anyway, the reaction of this step involves both the reduction and elimination of halogen atom from the steroid molecule.

During the reactions of this invention, substituents on other parts of the molecule may suffer hydrolysis, reduction oxidation, etc. These side reactions have no relation to the scope of this invention. The products of this invention, 2α,3α-epithio-5α-steroids, have a hormonal activity, e.g. myogenic, antiestrogenic, androgenic, antilipemic, uterotropic activity, etc., and are available for useful pharmacological activity as medicines, or as chemical intermediates for the preparation of hormonal medicines for pharmaceutical and veterinary uses. Such useful products include 2α,3α-epithio-5α-androstan-17β-ol including its esters and ethers, 2α,3α-epithio-5α-androst-6-en-17β-ol
2β-methyl-2α,3α-epithio-5α-androstan-17β-ol
3β-methyl-2α,3α-epithio-5α-androstan-17β-ol
7α-methyl-2α,3α-epithio-5α-androstan-17β-ol
2α,3α-epithio-17α-methyl-5α-androstan-17β-ol
2α,3α-epithio-5α-pregn-20-one
17α,21-dihydroxy-2α,3α-epithio-5α-pregnane-11,20-dione,
2α,3α-epithio-5α-cholestane, and the like, and their esters.

The new compound (II, adduct) can be prepared by reaction of a $\Delta^2$-5α-steriod (I) with a sulfur halide compound and can be converted to a useful 2α,3α-epithio-5α-steriod (III) by reaction with reducing and dehalogenating reagents. The compound (II) is represented by any one of the following four formulae showing the wall-defined structure at positions 2 and 3.

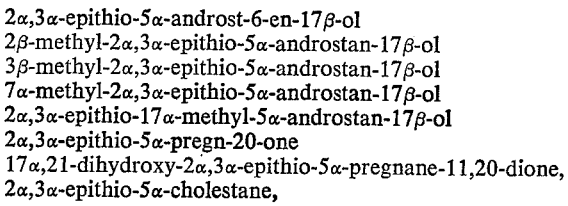
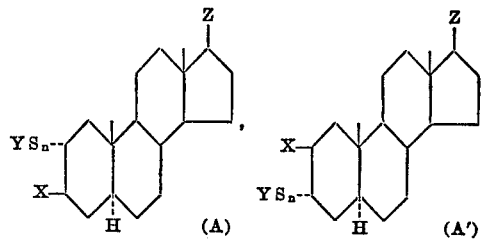

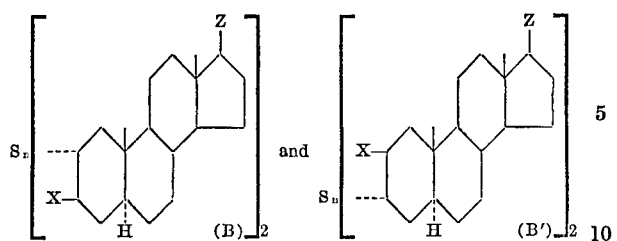 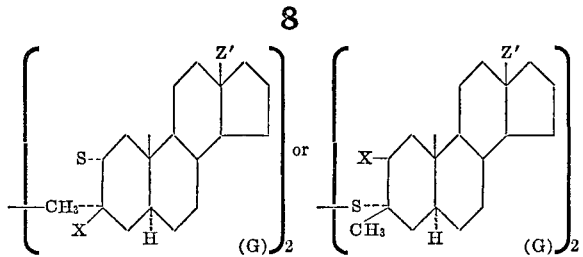

wherein X, Y, Z and n have the same significances as defined above, and where the steriod nucleus may be optionally substituted at additional positions by one or more of various substituents. Among compounds (II), the following compounds are especially important for practical use:

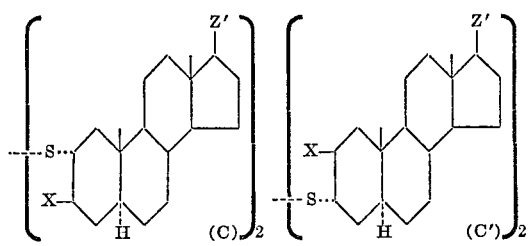 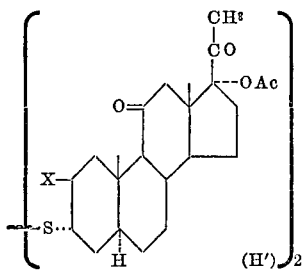

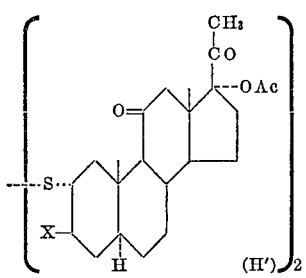

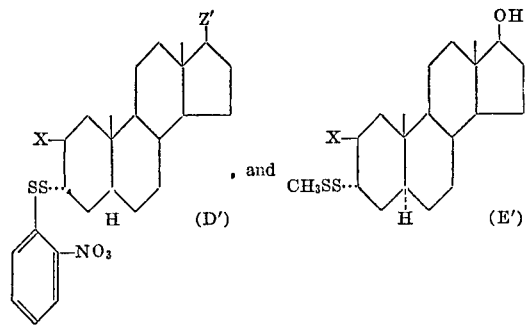

wherein X has the same significance as defined above, and Z' represents a monovalent hydroxy, lower alkanoyloxy, optionally substituted aromatic carboxy, or optionally substituted alkoxy or cycloalkoxy group, or a bivalent oxo or lower alkylenedioxy group. Those compounds (C) to E' are used for the synthesis of myogenic and antiestrogenic 2α,3α-epithio-5α-androstan-17β-ol and its derivatives.

Other important compounds are as follows:

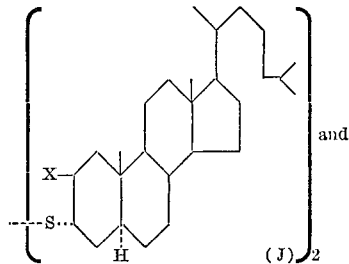

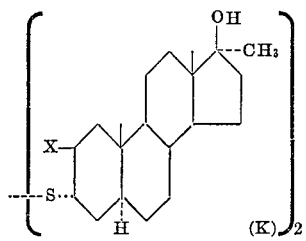

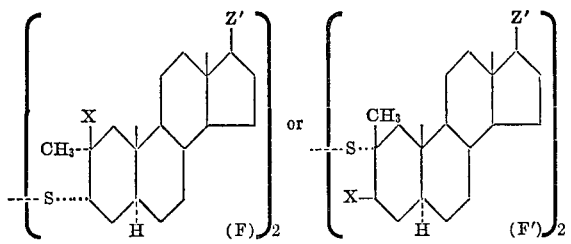

wherein X and Z' have the same significance as defined above. These compounds (C) to (K) can be prepared by reaction of the corresponding Δ²-5α-steroid (I) with a sulfur halide compound (V). Their physical data are shown in Table 1. The compounds (II, adduct, same with compound (A) to (B')) are useful as starting materials for synthesis of the corresponding 2α,3α-epithio-5α-steroids. Any compound II can be converted to other compounds within the definition of the compound II by conventional treatment, e.g. reduction of oxo to a hydroxy group, oxidation of hydroxy to an oxo group; acylation of hydroxy to an acyloxy group and hydrolysis of acylate to a hydroxy group.

TABLE 1.—PHYSICAL CONSTANTS OF THE ADDUCTS

[Adducts described in examples are purified by preparative thin-layer chromatography on silica gel and by recrystallization from the solvents indicated]

| Compound | Melting point: Rf of thin-layer chromatogram [1] | Molecular peak [2] | Elemental analysis | | | | | IR-spectrum (CHCl₃) cm.⁻¹ | NMR-spectrum [3] (CDCl₃) τ(60Mc) |
|---|---|---|---|---|---|---|---|---|---|
| | | | | C | H | O | S | Cl | |
| (structure: steroid with Cl, S, =O) | M.P. 206–8° from mixture of CH₂Cl₂, CH₃OH and ether. Rf 0.46 (EtOAc: cyclohexane (1:5)). | M⁺ 678 | C₃₈H₅₆S₂O₂Cl₂ C..  67.13   8.30   ——   9.41   10.43 F..  67.00   8.27   ——   9.96   10.65 | | | | | 1,733 s; 1,453 m; 1,375 m; 1,009 s; 980 m; 962 m; 909 m; 868 m. | 5.37 [7]; 6.62 [7.5]; 9.05 (3H); 9.32 (3H). |
| (structure: steroid with S, Cl, =O) | M.P. 250–2° from mixture of CH₂Cl₂ and CH₃OH. Rf 0.48 (EtOAc: cyclohexane (1:5)). | M⁺ 678 | C₃₈H₅₆S₂O₂Cl₂ C..  67.13   8.30   ——   9.41   10.43 F..  67.12   8.38   ——   9.59   10.59 | | | | | 1,735 s; 1,457 m; 1,376 m; 1,009 s; 978 m; 964 m; 842 m. | 6.15 [28]; 7.05 [broad]; 9.28 (3H); 9.32 (3H). |
| (structure: steroid with Cl, S, OH) | M.P. 125–6° from benzene. Rf 0.20 (EtOAc: benzene (1:2)). | M⁺ 682 | C₃₈H₆₀S₂O₂Cl₂ C..  67.73   8.84   4.63   9.38   10.37 F..  67.67   8.83   4.93   9.41   10.87 | | | | | 3,630 m; 1,452 m; 1,052 s; 1,020 m; 966 m; 869 m. | 5.40 [7.5]; 6.40 (t, J=7); 6.65 [7.5]; 8.91 (3H); 9.28 (3H). |
| (structure: steroid with Cl, S, OCOCH₃) | M.P. 217° C. (decomp.) from mixture of CHCl₃ and ether. Rf 0.04 (EtOAc: cyclohexane (1:5)). | M⁺ 766 | C₄₂H₆₄O₄S₂Cl₂ C..  65.68   8.40   8.33   8.35   9.23 F..  65.96   8.76   8.16   8.49   9.46 | | | | | 1,734 s; 1,450 m; 1,374 m; 1,254 s; 1,037 m; 1,206 m. | 5.42 [—]; 5.57 [—]; 6.67 (7); 8.92 (3H); 9.23 (3H). |
| (structure: steroid with Cl, SS-C₆H₄-NO₂, =O) | M.P. 203° C. from acetone. Rf 0.42 (EtOAc: cyclohexane (1:2)). | M⁺ 493 | C₂₅H₃₂NO₃S₂Cl (C, H, N, S, Cl) C..  60.77   6.53   2.83   12.98   7.18 F..  60.80   6.40   2.99   13.28   7.09 | | | | | 1,736 s; 1,592 m; 1,512 m; 1,569 m; 1,451 m; 1,341 s; 1,306 m; 1,099 m; 1,009 m; 850 m. | 1.65–2.68 (4H) 5.45 [7]; 6.65 [7]; 8.90 (3H); 9.32 (3H). |
| (structure: steroid with Cl, SS-C₆H₄-NO₂, OH) | M.P. 184° C. from acetone. Rf 0.26 (EtOAc: cyclohexane (1:2)). | M⁺ 495 | C₂₅H₃₄NO₃S₂Cl (C, H, N, S, Cl) C..  60.52   6.91   2.82   12.93   7.15 F..  60.81   6.94   2.70   13.02   7.16 | | | | | 3,615 m; 1,568 m; 1,592 m; 1,510 m; 1,450 m; 1,340 m; 1,304 m; 1,098 m; 1,050 m; 1,038 m; 1,020 m; 850 m. | 1.62–2.77 (4H); 5.43 [7]; 6.35 (t, J=3); 6.65 [7.5]; 8.93 (3H); 9.27 (3H). |
| (structure: steroid with CH₃, Cl, S, OCOCH₃) | Amorphous powder. Rf 0.18 (benzene:CHCl₃ (9:1)). | M⁺ 794 | ———————— | | | | | 1,730 s; 1,452 m, 1,378 m; 1,260 s, 1,040 m; 1,032 m, 901 m. | 5.43 [—]; 6.50 [4.5]; 8.00; 9.22; 9.27 (3H). |

TABLE 1—Continued

[Adducts described in examples are purified by preparative thin-layer chromatography on silica gel and by recrystallization from the solvents indicated]

| Compound | Melting point: R/ of thin-layer chromatogram [1] | Molecular peak [2] | Elemental analysis | IR-spectrum (CHCl₃) cm.⁻¹ | NMR-spectrum [3] (CDCl₃) τ(60Mc) |
|---|---|---|---|---|---|
| [structure with OCOCH₃, Cl, S, CH₃, H]₂ | Amorphous powder. R/0.20 benzene:CHCl₃ (9:1). | M⁺ 794 | | 1,730 s; 1,485 m; 1,452 m; 1,380 m; 1,261 s; 1,031 m. | 5.42 [—]; 6.45 [—]; 8.00 (3H); 8.40 [—]; 9.07 (3H); 9.22 [—]. |
| [structure with CH₃, =O, OCOCH₃, Cl, S, H]₂ | Amorphous powder. R/0.13 (benzene:CHCl₃ (9:1)). | M⁺ 878 | | 1,737 s, 1,710 s; 1,372 m; 1,358 m; 969 m. | 5.33; 6.33; 7.87 (3H); 8.00 (3H); 8.70 (3H); 9.43 (3H). |
| [structure with CH₃, CO, OCOCH₃, S, Cl, H] | Amorphous powder. R/0.17 (EtOAc: cyclohexane (1:2)). | M⁺ 878 | | 1,736 s; 1,710 s; 1,481 w; 1,373 m; 1,359 m; 1,253 s; 1,173 m; 969 m. | 5.41 [broad]; 6.64 (si); 7.88 (3H); 8.02 (3H); 8.71 (3H); 9.43 (3H). |

[1] Thin-layer chromatogram on silica gel.
[2] Molecular peak on mass spectrum.
[3] The numbers in brackets are the half-wave widths, given only where accurate values were obtained.
NOTE.—EtOAc=Ethyl acetate; C.=calculated value; F.=found value; s=strong; m=median strength; w=weak; t=triplet; si=singlet; 3H=singlet corresponding to 3 hydrogens; 4H=multiplet corresponding to 4 hydrogens.

The following examples further illustrate the advantages of this invention. In the examples, percentages are expressed by weight, isomer ratios are estimated by analysis of optional rotatory dispersion curves and mass-spectra, and the products are identified with authentic samples by mixed melting point determination, and comparison of infrared spectra and R/-values on thin-layer chromatograms. All the products show satisfactory values on elemental analysis.

EXAMPLE 1

To a stirred mixture of 3β-(toluene-p-sulfonyloxy)-5α-androstan-17-one (1.574 g.) and potassium tertiary butoxide (2.014 g.) is added dimethyl sulfoxide (10 ml.). After reaction for 1.5 hours at 55–63° C., a thin-layer chromatogram of the reaction mixture shows no spot for the starting material. The reaction mixture is then poured into water, neutralized with 10% hydrochloric acid, and extracted with chloroform. The extract solution is washed with 10% aqueous solution of sodium carbonate and water, dried and evaporated to remove the solvent. Purification of the residue by column chromatography on silica gel affords 0.395 g. (40% yield) of a mixture of 5α-androst-2- and 3-en-17-ones, M.P. 103.5–105.5° C., from the fraction eluted with benzene. The ratio of the Δ²- to Δ³-isomers is about 95:5. The remaining fractions from the chromatography contain 3α-hydroxy-5α-androstan-17-one, 3β-hydroxy-5α - androstan-17-one and 5α-androstan-3,17-dione.

EXAMPLE 2

To a solution of potassium tertiary butoxide (0.4 g.) in dimethyl sulfoxide (10 ml.) heated at about 75° C. is added 3β-(toluene-p-sulfonyloxy)-5α-androstan-17-one (0.517 g.) and the whole mixture is stirred at 74–79° C. for 20 minutes. The reaction mixture is poured into ice-water, and extracted with chloroform. The extract solution is washed with water, dried and evaporated to leave a residue. Purification of the residue by column chromatography on silica gel affords 0.203 g. (60% yield) of a mixture of 5α-androst-2- and 3-en-17-ones. The ratio of the Δ²:Δ³ isomers is about 94:6. Subsequent fractions give 0.082 g. (26% yield) of a mixture of 3α-hydroxy-5α-androstan-17-one and 3-β-hydroxy-5-α-androstan-17-one.

EXAMPLE 3

To a solution of 17,17-ethylenedioxy-3β-(toluene-p-sulfonyloxy)-5α-androstane (5 g.) in dimethyl sulfoxide (15.35 ml.) is added potassium tertiary butoxide (2.30 g.) and the mixture is heated at 85–90° C. for 1.5 hours. The reaction mixture is evaporated to remove the solvent. The residue containing 17,17-ethylenedioxy-5α-androst-2-ene is heated in a mixture of 30 ml. of methanol, 5 ml. of concentrated hydrochloric acid and 15 ml. of water at about 50° C. under agitation. The cooled mixture is filtered to collect the first crop of crystals which separate. The filtrate is concentrated to give a second crop of crystals which is collected by filtration and combined with the first crop. The crystals are dissolved in chloroform, and the solution is washed with water, dried and evaporated to give 2.074 g. (74.4% yield) of 5α-androst-2-en-17 one and 0.339 g. (11.7% yield) of 3α-hydroxy-5α-androstan-17-one. There is no detectable amount of 5α-androst-3-en-17-one in the crystals of 5α-androst-2-en-17-one.

EXAMPLE 4

To a solution of 17,17-ethylenedioxy-3β-(toluene-p-sulfonyloxy)-5α-androstane (5 g.) in dimethyl sulfoxide (15.35 ml.) is added potassium tertiary butoxide (2.30 g.) and the mixture is heated at 85–90° C. for 1.5 hours. After evaporaton of the solvent, the mixture is poured into water and extracted with dichloromethane. The extract solution is washed with water, dried and evaporated to dryness. The residue is dissolved in 10 ml. of pyridine and the solution is mixed with toluene-p-sulfonyl chloride (1.0 g.) and kept at room temperature for 20 hours. The reaction mixture is diluted with water, and extracted with methylene chloride. The extract solution is washed with water, dried and evaporated. The residue is treated with potassium tertiary butoxide at 85–90° C. for 1.5 hours. Working up again as above affords 2.680 g. (88% yield) of 5α-androst-2-en-17-one and 0.15 g. (5% yield) of 3α-hydroxy-5α-androstan-17-one.

EXAMPLES 5–11

By procedures similar to the above examples, the following reactions are carried out.

100 mg. of sulfur chloride, the mixture is stirred for 4 hours. The reaction mixture is concentrated under a reduced pressure to obtain 1340 mg. of a pale yellow resinous adduct. To a solution of the adduct in a mixture of dioxane (30 ml.), methanol (30 ml.), and water (2 ml.) is added 200 mg. of crystalline sodium borohydride under external ice-cooling. The solution is warmed to room temperature then stirred for one hour. A further addition of crystalline sodium borohydride (30 mg.) is then made and the mixture stirred for another hour. After a final addition of crystalline sodium borohydride (30 mg.) the mixture is kept in a refrigerator overnight. The reaction mixture is concentrated under reduced pressure, then washed with benzene to leave 1.4 g. of pale yellow residue. Purification of the residue by column chromatography on 50 g. of alumina affords 765 mg. (50% yield) of 2α,3α-epithio-5α-androstan-17β-ol, M.P. 125–126° C., in the benzene eluates. [α]$_D^{22}$+249±1.8° (c.=0.370, chloroform).

*Analysis.*—Calcd. for $C_{19}H_{30}OS \cdot \frac{1}{4} H_2O$ (percent): C, 73.37; H, 9.89; S, 10.31. Found (percent): C, 73.65; H, 9.83; S, 10.44.

| Experiment number [a] | Starting material | | | Base (mg.) | Solvent (ml.) | Time temp. | Yield (mg., percent) | Δ²:Δ³ ratio |
|---|---|---|---|---|---|---|---|---|
| | 3 [b] (Weight in mg.) | 17 [c] | Series | | | | | |
| 5 | Cl (318) | O | A | KOtBu (450) | DMSO (3) | 2 hrs. 50° C. | 140 50% | 95:5 |
| 6 | TsO (158) | OH | A | KOtBu (200) | t-BuOH (5) | 5 hrs. reflux | 11 10% | 93:7 |
| 7 | BzO (394) | O | A | NaOCH₃ (109) | MeOH, DMSO (2, 0.16) | 3 hrs. 50° C. | 169 62% | 95:5 |
| 8 | MsO (388) | OH | A | NaH (50) | DMSO (5) | 5 hrs. 70–75° C. | 181 66% | 95:5 |
| 9 | TsO (48.9 g.) |  (45.1 g.) | A | KOtBu (45.1 g.) | DMSO (300) | 2 hrs. 65–68° C. | 20 g. 79% | 100:0 |
| 10 | TsO (236) | 20-one (168) | P | KOtBu (168) | DMSO (5) | 2 hrs. 90° C. | 105 70% | 98:2 |
| 11 | TsO (272) | ———— | C | KOtBu (112) | DMSO (3) | 2 hrs. 60° C. | 117 63% | 97:3 |

[a] Example number.
[b] Substituent at position 3.
[c] Substituent at position 17 (or 20 when indicated).

NOTE.—KOtBu=potassium tertiary butoxide; DMSO=dimethyl sulfoxide; O=oxo; TsO=toluene-p-sulfonyloxy; t-BuOH=tertiary butanol; BzO=benzyloxy; MsO=methanesulfonyloxy; A=androstane; P=pregnane; C=cholestane.

By-products.—Example 5, 10 mg. (3%) of 3β-hydroxy-5α-androstan-17-one. Example 6, 60 mg. (54%) of 3β-hydroxy-5α-androstan-17-one. Example 8, 53 mg. (14.3%) of starting material. Example 9, 5.1 g. (15.4%) of 3(α or β)-hydroxy-5α-androstan-17-one. Example 10, 3α- or 3β-hydroxy-5α-pregnan-20-one (0.01 g., 6%), and Example 11, 3β-hydroxy-5α-cholestane (0.03 g., 15%).

Comparative experiments

To determine the superiority of the new process, introduction of a double bond into a steroid was carried out by conventional pyrolysis:

| Experiment number [a] | Starting material | | | Base (mg.) | Solvent (ml.) | Time temp. | Yield (mg., percent) | Δ²:Δ³ ratio |
|---|---|---|---|---|---|---|---|---|
| | 3 [b] (Weight in mg.) | 17 [c] | Series | | | | | |
| i | TsO (4,450) | O | A | ———— | DMSO (10) | ⅙ hr. 150° C. | 2,700 99% | 79:21 |
| ii | Brosyloxy (2,500) | O | A | ———— | DMSO (10) | ⅙ hr. 150° C. | 870 64% | 81:19 |
| iii | MsO (1,840) | O | A | ———— | DMSO (10) | ⅙ hr. 150° C. | 960 86% | 78:22 |

NOTE.—Abbreviations and footnotes are the same as those of Examples 5–11.

EXAMPLE 12

To a stirred solution of a mixture of 5α-androst-2- and 3-en-17-ones (1088 mg.), obtained by the method of Example 1, in 10 ml. of dichloromethane, is added a solution of sulfur monochloride (270 mg.) in dichloromethane (5 ml.), and the whole mixture is stirred overnight at room temperature. After addition of another Fractions eluted with chloroform afford a mixture (577 mg.) consisting of more polar substances, di-(2β-chloro-17β-hydroxy-5α-androstan-3α-yl) disulfide (reduced adduct), di-(3β-chloro-17β-hydroxy-5α-androstan-2α-yl) disulfide, and di-(2β-chloro-17β-hydroxy-5α-androstan-3α-yl) trisulfide.

EXAMPLE 13

To a stirred solution of 5α-androst-2-en-17-one (2.72 g.) in acetonitrile (30 ml.) is added a solution of sulfur monochloride (0.81 g.) in acetonitrile (5 ml.) and the mixture is stirred at 20° C. for 1.5 hours. The reaction mixture is concentrated under reduced pressure to obtain amorphous adduct. The adduct is dissolved in a mixture of tetrahydrofuran (10 ml.) and dimethyl sulfoxide (10 ml.). The solution is cooled with ice-water and mixed with sodium sulfide nonahydrate (2.5 g.) dissolved in the least necessary amount of water. After the mixture has been stirred for 35 minutes, it is poured into ice-water and extracted with chloroform. The extract solution is washed with water, dried, and evaporated. A solution of the residue in a mixture of tetrahydrofuran (16 ml.) and methanol (8 ml.) is treated with sodium borohydride (0.19 g.) under ice-cooling for 30–40 minutes. After evaporation of the solvent, the residue is dissolved in chloroform, and the solution is washed with water, dried, and evaporated to give a residue which is chromatographed on a column of alumina (20 g.) to afford 1.9 g. (62% yield) of $2\alpha,3\alpha$-epithio-$5\alpha$-androstan-$17\beta$-ol and 0.036 g. (1.3% yield) of $5\alpha$-androst-2-en-$17\beta$-ol.

EXAMPLE 14

To a stirred solution of $5\alpha$-androst-2-en-17-one (2.76 g.) in dichloromethane (30 ml.) are added a catalytic amount of iron powder and a solution of sulfur monochloride (0.82 g.) in dichloromethane (10 ml.). After the reaction mixture has been stirred for 1 hour at room temperature, its thin-layer chromatogram no longer show a spot for the starting material. Evaporation of the reaction mixture under reduced pressure gives 3.8 g. of adduct as an oily residue. To a solution of the residue in a cooled mixture (10° C.) of dimethyl sulfoxide (25 ml.) and dichloromethane (25 ml.) is added sodium sulfide nonahydrate (6 g.) dissolved in the least necessary amount of water, and the whole is stirred for 15 minutes. The reaction mixture is poured into water, extracted with chloroform, and the extract solution is evaporated to give 2.6 g. of crude $2\alpha,3\alpha$-epithio-$5\alpha$-androstan-17-one. The crude product is dissolved in a mixture of methanol (10 ml.) and tetrahydrofuran (10 ml.) and reduced with sodium borohydride (0.2 g.) for 40 minutes under ice-cooling. The reaction mixture is evaporated and the residue is extracted with chloroform. The extract solution is washed and evaporated to dryness. Purification of the residue by chromatography over alumina gives 1.8 g. (58.9% yield) of pure $2\alpha,3\alpha$-epithio-$5\alpha$-androstan-$17\beta$-ol.

EXAMPLE 15

To a solution of $5\alpha$-androst-2-en-17-one (2.72 g.) in dichloromethane (100 ml.) o - nitrophenylthiosulfenyl chloride (2.33 g.) is added in the dark, then a catalytic amount of iron powder is added and the solution is stirred at room temperature for 2 hours. The reaction mixture is then evaporated to give resinous adduct, or alternatively, it is diluted with 100 ml. of methanol, and sodium sulfide nonahydrate (12 g.) is added under ice-cooling. After 1 hour, the reaction mixture is poured into water, and extracted with dichloromethane. The extract solution is washed with water, dried and evaporated to give a residue which is chromatographed on a column of silica gel (80 g.) to give 0.33 g. of the starting material and 2.22 g. (73% yield) of $2\alpha,3\alpha$-epithio-$5\alpha$-androstan-17-one. Reduction of the latter product in a mixture of methanol (40 ml.) and dioxane (40 ml.) with sodium borohydride (0.14 g.) under ice-cooling affords 2.1 g. (68% yield) of $2\alpha,3\alpha$-epithio-$5\alpha$-androstan-$17\beta$-ol, M.P. 126–129° C.

EXAMPLE 16

To a stirred solution of $17\beta$-acetyloxy-2-methyl-$5\alpha$-androst-2-ene (165.3 mg.) in dichloromethane (5 ml.) are added catalytic amount of iron powder and sulfur monochloride (74 mg.), at room temperature. After stirring for 2 hours, the mixture is let standing overnight, and then is evaporated under reduced pressure to leave residue, which is chromatographed on column of silica gel (10 g.). Amorphous adduct (48 mg.) showing a spot at R$f$ 0.2 (benzene:chloroform (9.1)) is obtained by evaporation of eluate. To a stirred solution of the adduct (74 mg.) in a mixture of dimethyl sulfoxide (1 ml.) and tetrahydrofuran (1 ml.) is added sodium sulfide nonahydrate (200 mg.) dissolved in the least necessary amount of water, under ice-cooling. After stirring at the same temperature for 1.5 hours, the mixture is diluted with water and extracted with ether. The extract solution is washed with water, dried and evaporated. Purification of residue (45 mg.) by column chromatography on silica gel (1 g.) affords $17\beta$-acetyloxy-2-methyl-$5\alpha$-androst-2-ene (2 mg.) and $17\beta$-acetyloxy-$2\beta$-methyl-$2\alpha,3\alpha$-epithio-$5\alpha$-androstane (23 mg.), M.P. 142° C. (from ether). R$f$: 0.29 (SiO$_2$; benzene:chloroform (9:1)).

EXAMPLE 17

To a stirred solution of $17\beta$-acetyloxy-3-methyl-$5\alpha$-androst-2-ene (165.3 mg.) in dichloromethane (10 ml.) is added sulfur monochloride (74 mg.), at room temperature. After stirring for 12 hours, the mixture is evaporated under reduced pressure to leave residue, which is chromatographed on column of silica gel (10 g.). Fractions eluted with benzene afford the starting steroid (75 mg.). Fractions eluted with a mixture of benzene and ether (10:1) afford adduct (80 mg.). To a stirred solution of the adduct (68 mg.) in a mixture of dimethyl sulfoxide (1 ml.) and tetrahydrofuran (1 ml.) is added sodium sulfide nonahydrate (200 mg.) dissolved in the least necessary amount of water, under ice-cooling. After 2 hours, the mixture is extracted with ether. The extract solution is washed with water, dried, and evaporated to give 31 mg. of residue. Purification of the residue by column chromatography over silica gel (1.2 g.) affords $17\beta$-acetyloxy-3-methyl-$5\alpha$-androst-2-ene (1 mg.), $17\beta$-acetyloxy-3-methyl-$2\alpha,3\alpha$-epithio-$5\alpha$-androstane (15 mg.) and unidentified product (12 mg.). Purified epithio compound has melting point 139–140° C. (from ether). R$f$: 0.28 (silica gel; benzene:chloroform (9:1)).

EXAMPLE 18

To a stirred solution of $17\alpha$-acetyloxy-$5\alpha$-pregn-2-ene-11,20-dione (186 mg.) in dichloromethane (10 ml.) are added catalytic amount of iron powder and sulfur monochloride (37 mg.) at room temperature. After 2 hours stirring, another sulfur monochloride (19 mg.) is added and stirred for 2 hours, and then is let standing overnight. The reaction mixture is evaporated under reduced pressure to give oil (220 mg.) which is chromatographed on column of silica gel. The first fraction gives the starting steroid (10 mg.) and further fraction eluted with benzene containing 10% ether gives amorphous adduct (200 mg.). To a stirred solution of the adduct (200 mg.) in dimethyl sulfoxide (3 ml.) and tetrahydrofuran (3 ml.) is added sodium sulfide nonahydrate (800 mg.) dissolved in the least amount of water, under ice-cooling. After stirring at the same temperature for 30 minutes to 1 hour, the mixture is extracted with ether. The extract solution is washed with water, dried, and evaporated to give colorless oily residue (133 mg.) which is chromatographed on column of silica gel (3 g.). The first fraction gives 43 mg. of the starting steroid. The second fraction gives a mixture (27 mg.) of the starting steroid and $17\alpha$-acetyloxy-$2\alpha,3\alpha$-epithio-$5\alpha$-pregnane-11,20-dione. The third fraction gives $17\alpha$-acetyloxy-$2\alpha,3\alpha$-epithio-$5\alpha$-pregnane-11,20-dione (37 mg.), M.P. 177–178° C. (from ether). R$f$: 0.32 (silica gel; ethyl acetate:cyclohexane (1:2)).

EXAMPLE 19

To a stirred solution of a mixture of $5\alpha$-androst-2- and 3-en-17-ones (274 mg.) in dichloromethane (5 ml.) is added a solution of sulfur monochloride (80 mg.) in dichloromethane (2 ml.), and the mixture is stirred at room temperature overnight. The reaction mixture is evaporated to give 360 mg. of adduct. To a solution of the adduct (342 mg.) in methanol (2 ml.) is added sodium sulfide nonahydrate (360 mg.), and the solution is stirred at room temperature for 10 minutes. The reaction mixture is diluted with water and extracted with chloroform. The extract solution is washed with water, dried, and evaporated under a reduced pressure to remove solvent. Purification of the residue by filtration through a layer of alumina and recrystallization from methanol affords 2α,3α-epithio-5α-androstan-17-one, M.P. 106–108° C.

EXAMPLE 20

To a mixture of 5α-androst-2-en-17β-ol (275 mg.), dichloromethane (2 ml.), and two drops of pyridine is added a solution of methylthiosulfenyl chloride (160 mg.) in dichloromethane (1 ml.) and the mixture is kept at room temperature overnight. The adduct obtained by evaporation of the reaction mixture is dissolved in dioxane (2 ml.) and stirred with sodium metal (100 mg.) in liquid ammonia (10 ml.) overnight. After evaporation of ammonia, the residue is dissolved in chloroform, washed with water, dried, and evaporated to give 2α,3α-epithio-5α-androstan-17β-ol, M.P. 125–126° C.

EXAMPLE 21

A mixture of a solution of 5α-androst-2-en-17-one (1.50 g.) in dichloromethane (15 ml.), and a solution of sulfur monochloride (0.446 g.) in dichloromethane (3 ml.) is kept at room temperature overnight. The reaction mixture is evaporated under reduced pressure to give a pale yellow adduct (1.973 g.). The adduct is dissolved in a mixture of dioxane (10 ml.), methanol (10 ml.), and water (1 ml.), treated with a mixture of sodium borohydride (0.105) g.) and potassium hydroxide (0.310 g.), and stirred at room temperature for 1 hour. After storage in refrigerator overnight, the reaction mixture is evaporated, and the residue is dissolved in chloroform. The extract solution is washed with diluted hydrochloric acid and water, dried over anhydrous sodium sulfate, and evaporated to dryness under a reduced pressure. Purification of the residue by chromatography on 40 g. alumina gives 1.172 g. (70% yield) of 2α,3α-epithio-5α-androstan-17β-ol, M.P. 127–128° C. $[α]_D^{23}$+24.8° (c.=1.001, chloroform).

EXAMPLE 22

The same compound is obtained by the action of lithium aluminum hydride in tetrahydrofuran or aluminum amalgum on the adduct obtained in Example 21.

EXAMPLE 23

To a solution of 5α-androst-2-en-17-one (1.09 g.) in dichloromethane (10 ml.) is added a solution of sulfur monochloride (0.37 g.) in dichloromethane (5 ml.). After 4 hours, the mixture is evaporated under reduced pressure to obtain 1.34 g. of oily adduct. The adduct dissolved in a mixture of dioxane (30 ml.), methanol (30 ml.), and water (2 ml.), is reduced with sodium borohydride (0.26 g.) under ice-cooling and stirring at room temperature for 1 hour. The reaction mixture is evaporated under a reduced pressure and the residue obtained is dissolved in benzene. The solution is washed, dried and evaporated to give 1.4 g. of oil, which is chromatographed on alumina (50 g.) to afford 0.585 g. (38.2% yield) of 2α,3α-epithio-5α-androstan-17β-ol, M.P. 125–126° C., from benzene eluate, and 0.54 g. of di-(2β-chloro-17β-hydroxy-5α-androstan-3α-yl) disulfide, M.P. 192–194° C. (from benzene), from chloroform eluate. The latter is treated with acetic anhydride and pyridine at room temperature to give diacetate, M.P. 217° C. (decomp.), M+ 766. Reduction of di-(2β-chloro-17β-hydroxy-5α-androstan-3α-yl) disulfide (0.3 g.) in tetrahydrofuran (15 ml.) with lithium aluminum hydride (0.1 g.) for 30 minutes affords 0.23 g. of 2α,3α-epithio-5α-androstan-17β-ol. The same conversion is also effected by the action of sodium sulfide nonahydrate.

EXAMPLE 24

A mixture of 17α-methyl-5α-androst-2-en-17β-ol (160 mg.), dichloromethane (2 ml.), and sulfur chloride (47 mg.) is kept at room temperature overnight. The reaction mixture is evaporated under reduced pressure to give pale yellow adduct. The adduct is dissolved in a mixture of dioxane (1 ml.), methanol (1 ml.), and water (0.1 ml.), and sodium sulfide nonahydrate (150 mg.) is added thereto. After the mixture is stirred for 1 hour, the reaction mixture is poured into ice-water and extracted with chloroform. The extract soltuion is washed with water, dried and evaporated. Purification of the residue by chromaography on silica gel affords 17α-methyl-2α,3α-epithio-5α-androstan-17β-ol, M.P. 168–169° C.

EXAMPLE 25

To a stirred solution of cholest-2-ene (186 mg.) in dichloromethane (1 ml.) is added sulfur monochloride (45 mg.), and the mixture is kept at room temperature overnight. The reaction mixture is evaporated, and extracted with chloroform. The extract solution is washed, dried, and evaporated to give adduct, which is treated with sodium sulfide nonahydrate (200 mg.) in a mixture of dioxane (1 ml.) and methanol (1 ml.), at room temperature for 0.5 hours. The reaction mixture is diluted with chloroform, washed, dried, and evaporated to give oily residue. Purification of the residue by preparative thin-layer chromatography on silica gel (benzene:hexane (1:2)), and recrystallization affords 2α,3α-epithio-cholestane, M.P. 123–124° C.

What I claim is:

1. A process for the preparation of a $Δ^2$-5α-steroid, which consists of the reaction of a 3(α or β)-halo- or acyloxy-5α-steroid with a basic acid-eliminating reagent.

2. A process claimed in claim 1, wherein the $Δ^2$-5α-steroid is an optionally substituted $Δ^2$-5α-androstane compound.

3. A process claimed in claim 1, wherein the $Δ^2$-5α-steroid is 5α-androst-2-en-17-one or 5α-androst-2-en-17β-ol.

4. A process claimed in claim 1, wherein the halogen atom or the 3(α or β)-halo-5α-steroid is selected from chlorine and bromine, and the acyloxy group of the 3(α or β)-acyloxy-5α-steroid is selected from the group consisting of benzoyloxy, p-bromobenzoyloxy, benzene-sulfonyloxy, toluene-p-sulfonyloxy, p-bromobenzenesulfonyloxy, methanesulfonyloxy, and ethanesulfonyloxy groups.

5. A process claimed in claim 1, wherein the 3(α or β)-acyloxy-5α-steroid is 17,17-ethylenedioxy-(3α or β)-(toluene-p-sulfonyloxy)-5α-androstane.

6. A process claimed in claim 1, wherein the basic acid-eliminating reagent is selected from the group consisting of alkali metal alkoxides, alkali metal amides, alkali metal hydrides, and alkali metal salts of dimethyl sulfoxide.

7. A process climed in claim 1, wherein the molar ratio of acid-eliminating reagent, potassium tertiary butoxide, to the starting compound is greater than one.

8. A process claimed in claim 1, wherein the reaction is carried out in a solvent.

9. A process claimed in claim 1, wherein the weight of dimethyl sulfoxide solvent utilized is more than twice that of the starting compound.

10. A process claimed in claim 1, wherein the reaction is carried out at a temperature in the range from 60° C. to 95° C., for a duration of from 30 minutes to 5 hours.

11. A process for the preparation of a 2α,3α-epithio-5α-steroid, which comprises reaction of a $Δ^2$-5α-steroid with a sulfur halide compound of the formula:

$$YS_nX \qquad (V)$$

wherein X represents a halogen atom; Y represents a halogen atom or an optionally substituted lower hydrocarbon group; and n represents an integer of or more, to obtain adducts which are then treated with reducing and dehalogenating reagents.

12. A process claimed in claim 11, wherein less than 1 mole equivalent of Δ²-5α-steroid is reacted with 1 mole equivalent of the sulfur halide compound.

13. A process claimed in claim 11, wherein the Δ²-5α-steroid is an optionally substituted Δ²-5α-androstane or pregnane compound.

14. A process claimed in claim 11, wherein the Δ²-5α-steroid is 5α-androst-2-en-17-one.

15. A process claimed in claim 11, wherein the sulfur halide compound is selected from the group consisting of sulfur monochloride, sulfur monobromide, trisulfur dichloride, tetrasulfur dichloride, methanethiosulfenyl chloride, ethanethiosulfenyl chloride, butanethiosulfenyl chloride, benzylthiosulfenyl chloride, phenylthiosulfenyl bromide, o-nitrophenylthiosulfenyl chloride, toluene-p-thiosulfenyl chloride, p-bromobenzylthiosulfenyl chloride, o-nitrophenyltrithiosulfenyl chloride, and 2,4-dinitrophenyltetrathiosulfenyl chloride.

16. A process claimed in claim 11, wherein the reaction is carried out in a solvent.

17. A process claimed in claim 11, wherein the reaction is carried out in halogenated hydrocarbons, ethers, or acetonitrile.

18. A process claimed in claim 11, wherein the reaction is carried out in the presence of a catalyst.

19. A process claimed in claim 11, wherein the reaction is carried out in the presence of iron.

20. A process claimed in claim 11, wherein the reaction is carried out at a temperature in the range from 0° C. to 40° C. for a duration from 1 to 50 hours.

21. A process claimed in claim 11, wherein the reducing and dehalogenating reagents are alkali metal sulfide or alkali metal borohydride.

22. A process claimed in claim 11, wherein the reducing and dehalogenating reagents are sodium sulfide or sodium borohydride.

23. A process claimed in claim 11, wherein the reducing reagent is sodium borohydride and dehalogenating reagent is potassium hydroxide.

24. A process claimed in claim 11, wherein the reaction and dehalogenation is carried out in a solvent.

25. A process claimed in claim 11, wherein the reduction and dehalogenation is carried out at a temperature in the range from 0° C. to 40° C. for a duration from 0.1 to 5 hours.

26. A compound selected from the group consisting of the compounds represented by the formulae:

wherein X is a halogen atom; and Z' is a monovalent hydroxy, lower alkanoyloxy, optionally substituted lower aromatic carboxy, tetrahydropyranyloxy, tetrahydrofuranyloxy, 1-lower cycloalkenyloxy, 1-lower alkoxy-, 1-lower cycloalkyloxy or a bivalent oxo or lower alkylenedioxy group.

27. A compound claimed selected from the group consisting of the compounds represented by the formulae:

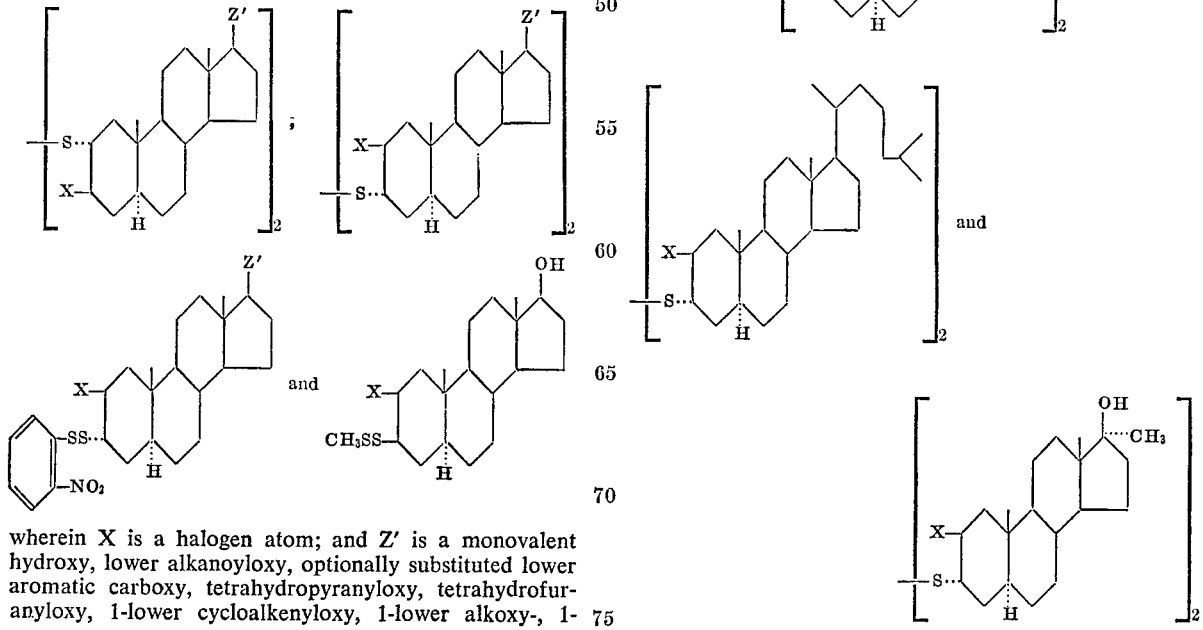

wherein X is a halogen atom; Z' is a monovalent hydroxy, lower alkanoyloxy, optionally substituted lower aromatic carboxy, tetrahydropyranyloxy, tetrahydrofuranyloxy, 1-lower cycloalkenyloxy, 1-lower alkoxy-, 1-cycloalkyloxy or a bivalent oxo or lower alkylenedioxy group; and Ac is an acetyl group.

28. The compound di-(2$\beta$-chloro-17$\beta$-hydroxy-5$\alpha$-androstan-3$\alpha$-yl) trisulfide.

References Cited
UNITED STATES PATENTS

| | | | |
|---|---|---|---|
| 3,682,898 | 8/1972 | Klimstra | 260—239.5 |
| 3,673,173 | 6/1972 | Komeno | 260—239.5 |
| 3,657,225 | 4/1972 | Komeno | 260—239.5 |

ELBERT L. ROBERTS, Primary Examiner

U.S. Cl. X.R.

260—239.55 C, 397.2, 397.3, 397.45, 397.5